United States Patent [19]

Bessacini et al.

[11] Patent Number: 5,987,362
[45] Date of Patent: *Nov. 16, 1999

[54] FINAL APPROACH TRAJECTORY CONTROL WITH FUZZY CONTROLLER

[75] Inventors: Anthony F. Bessacini, Narragansett; Robert F. Pinkos, Saunderstown, both of R.I.

[73] Assignee: The United States of America as represented by the Secretary of the Navy, Washington, D.C.

[ * ] Notice: This patent is subject to a terminal disclaimer.

[21] Appl. No.: 08/957,995

[22] Filed: Oct. 6, 1997

[51] Int. Cl.$^6$ ...................................................... G06F 17/00
[52] U.S. Cl. ................................ 701/1; 701/27; 244/3.13; 244/3.15; 706/900; 706/905
[58] Field of Search ................................ 701/1, 13, 27; 244/3.1, 3.13, 3.15, 3.19; 706/900, 905

[56] References Cited

U.S. PATENT DOCUMENTS

| | | | |
|---|---|---|---|
| 4,732,349 | 3/1988 | Maurer | 244/3.13 |
| 5,080,300 | 1/1992 | Stubbs et al. | 244/3.11 |
| 5,101,351 | 3/1992 | Hattori | 701/27 |
| 5,118,050 | 6/1992 | Arnold et al. | 244/3.14 |
| 5,122,957 | 6/1992 | Hattori | 701/27 |
| 5,319,556 | 6/1994 | Bessacini | 701/21 |
| 5,429,322 | 7/1995 | Waymeyer | 701/3 |
| 5,436,832 | 7/1995 | Bessacini et al. | 701/27 |
| 5,671,138 | 9/1997 | Bessacini et al. | 701/27 |
| 5,671,140 | 9/1997 | Bessacini et al. | 701/27 |

Primary Examiner—William A. Cuchlinski, Jr.
Assistant Examiner—Gertrude Arthur
Attorney, Agent, or Firm—Michael J. McGowan; Prithvi C. Lall; Michael F. Oglo

[57] ABSTRACT

A tail chase guidance system for directing a steerable object, such as a torpedo, to a contact along a final approach course. The guidance system senses a bearing from the steerable object to the contact and the course of the steerable object. If the contact is moving, the system determines a contact course as a final approach course; if stationary, a value is provided for the final approach course. Various signals are then generated based upon these bearings and courses and classified into sensed linguistic variables based on membership functions from the different sensed variable membership function sets to become fuzzy inputs to a controller that produces fuzzy control output linguistic variables and associated membership functions from a control output membership function set based upon logical manipulation of the fuzzy inputs. These fuzzy control output membership functions are converted into an output having an appropriate form for controlling the trajectory so that the steerable object intercepts the contact along the final approach course.

20 Claims, 11 Drawing Sheets

α

|   | NL | NM | NS | ZE | PS | PM | PL |
|---|----|----|----|----|----|----|----|
| PL | NL | NL | NL | NL | NM | NM | NL |
| PM | NL | NM | NM | NM | NM | PS | ZE |
| PS | NM | NS | NS | NS | PS | PM | PM |
| ZE | NL | NL | NS | ZE | PS | PL | PL |
| NS | NM | NM | NS | PS | PS | PS | PM |
| NM | ZE | NS | PM | PM | PM | PM | PL |
| NL | PL | PM | PM | PL | PL | PL | PL |

β (row labels on left)

| FIGURE | POINT | INPUTS (°) | | | | | LINGUISTIC VARIABLES | | | |
|---|---|---|---|---|---|---|---|---|---|---|
| | | Bpc | Cc | Cp | α | β | α | β | ΔC |
| 7 | 11 | -45 | 120 | 0 | | | | | |
| | 73 | -46 | 120 | 0 | -166 | 46 | NL | PM | NL |
| | 74 | -27 | 120 | -76 | -147 | -49 | NL | NM | ZE |
| | 75 | -15 | 120 | -76 | -135 | -61 | NL | NL/NM | PL/ZE |
| | 76 | 57 | 120 | -6 | -63 | -63 | NL/NM | NL/NM | PL/ZE/PM/NS |
| | 77 | 96 | 120 | 51 | -24 | -45 | NM/NS | NM | NS/PM |
| | 78 | 101 | 120 | 76 | -19 | -25 | NS | NM/NS | NM/NS |
| | 79 | 120.2 | 120 | 106 | 0.2 | -14.2 | ZE/PS | NS | PS/PS |
| 8 | 11 | 0 | 180 | -45 | | | | | |
| | 80 | 1 | 180 | -45 | -179 | -46 | NL | NM | ZE |
| | 81 | 16 | 180 | -45 | -164 | -61 | NL | NL/NM | PL/ZE |
| | 82 | 47 | 180 | -14 | -133 | -61 | NL | NL/NM | PL/ZE |
| | 83 | 84 | 180 | 23 | -96 | -61 | NL | NL/NM | PL/ZE |
| | 84 | 156 | 180 | 115 | -24 | -41 | NM/NS | NM | NS/PM |
| | 85 | 161 | 180 | 137 | -19 | -24 | NS | NM/NS | PM/NS |
| | 86 | -179.6 | 180 | 164 | 0.4 | -16.4 | ZE/PS | NS | PS/PS |
| 9 | 11 | 45 | 135 | -45 | | | | | |
| | 90 | 47 | 135 | -45 | -88 | -92 | NL | NL | PL |
| | 91 | 51 | 135 | -5 | -84 | -56 | NL | NM | ZE |
| | 92 | 56 | 135 | -5 | -79 | -61 | NL | NL/NM | PL/ZE |
| | 93 | 89 | 135 | 27 | -46 | -62 | NM | NL/NM | PM/NS |
| | 94 | 108 | 135 | 52 | -27 | -56 | NM/NS | NM | NS/PM |
| | 95 | 135.1 | 135 | 125.3 | 0.1 | -9.8 | ZE/PS | NS | PS/PS |
| | 96 | 135 | 135 | 135 | 0 | 0 | ZE | ZE | ZE |

FINAL APPROACH TRAJECTORY CONTROL WITH FUZZY CONTROLLER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

This invention generally relates to a control system located at a first, or reference, site for guiding a steerable object from that site toward a contact or target. More specifically this invention relates to such a control system that guides the steerable object to a predetermined final approach course to the contact.

(2) Description of the Prior Art

Real time control systems based upon sensory inputs find application in air-, land- and underwater-based vehicles. If the range, course, speed and bearing of a target are known, a "target intercept" control mode can be used. In the target intercept control mode, a control system predicts the trajectory of the target and directs the torpedo to an anticipated intercept point. A control system operating in a "target pursuit" mode directs the torpedo so that it always points toward the target. In a "beam riders" control mode the control system directs the torpedo along a bearing between the submarine and the target. U.S. Pat. No. 5,319,556 to Bessacini (1994) discloses adaptive trajectory apparatus for selecting one of these control modes based upon information available during each update cycle for a given situation. U.S. Pat. No. 5,436,832 to Bessacini et al. (1995) discloses guidance system based upon beam rider control using fuzzy control logic. U.S. Pat. No. (Ser. No. 08/498,810 filed Jul. 6, 1995) by Bessacini et al. for a Fuzzy Controller for Acoustic Vehicle Target Intercept Guidance discloses one version of a target intercept guidance system.

The foregoing control systems direct a steerable object, such as a torpedo, to intercept a contact at an arbitrary angle. However many contacts have different sensitivities to noise in different directions. For example, a target constituted by a moving submarine is least likely to detect a torpedo approaching along its course line from the stern. The noise that the contact produces through propeller and other noise tends to be masking and minimize the chance of such detection. Moreover if a torpedo approaches the stern of a submarine it is more likely to cripple the submarine by damaging the propellers and or steering mechanisms with a minimal torpedo detonation. It is also characteristic of such an approach that the torpedo tends to move away initially from the bearing between the launching vehicle and the contact thereby to minimize any chance that the torpedo or other steerable object will mask signals used to provide contact state.

Such a trajectory, called a "tail chase" trajectory is highly desirable. Prior fuzzy controllers have the ability to achieve such a trajectory, but only if a launching vehicle is properly positioned relative to the contact at the time of launch. Other classical approaches that produce a target pursuit trajectory are more likely to produce a tail chase trajectory. However, in actual practice it has been found that, under certain circumstances, turn rates required by such classical techniques have not been attainable. Consequently the classical methods do not produce a tail chase trajectory as a standard final approach to a target. Consequently none of the control systems including those implemented in accordance with classical approaches or the foregoing Bessacini et al. patents (and applications) incorporate any mechanism for readily producing a tail chase trajectory.

SUMMARY OF THE INVENTION

Therefore it is an object of this invention to provide an improved guidance system for automatically guiding a steerable object to approach a contact along a predetermined final approach course.

Another object of this invention is to provide a guidance system using an improved fuzzy controller located at a launching vehicle that operates in a tail chase trajectory mode for automatically guiding a steerable object into a final approach to the target along a desired approach angle.

Yet another object of this invention is to provide a guidance system using an improved fuzzy controller that operates in a tail chase trajectory mode for automatically guiding a steerable object, such as a torpedo, toward a contact wherein the launching vehicle can undergo independent motion and wherein the contact may or may not undergo independent motion.

Still another object of this invention is to provide a guidance system using an improved fuzzy controller for producing a tail chase trajectory for a steerable object to approach a moving contact.

Still yet another object of this invention is to provide a guidance system with an improved fuzzy controller for producing an approach toward a stationary contact along a predetermined final course.

In accordance with one aspect of this invention, an iterative method and system generate a command signal for guiding a steerable object from a launching vehicle to a contact in response to signals from sensing means corresponding to a bearing from the steerable object to the contact, the course of the steerable object and a final approach course. During each iteration, the system generates first sensed variable signals in response to the bearing from the steerable object to the contact and the final approach course and second sensed variable signals in response to that bearing and the course of the steerable object. A fuzzy control system responds to the sensed variable signals by generating a command signal for guiding the steerable object that intercepts the contact along the final approach course.

BRIEF DESCRIPTION OF THE DRAWINGS

It is intended that the appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 6 represents a rule-based matrix incorporated in the rule-based unit of FIG. 5;

FIG. 10 is a chart that summarizes the operations that FIGS. 7 through 9 depict.

DESCRIPTION OF THE PREFERRED EMBODIMENT

Figure 1:
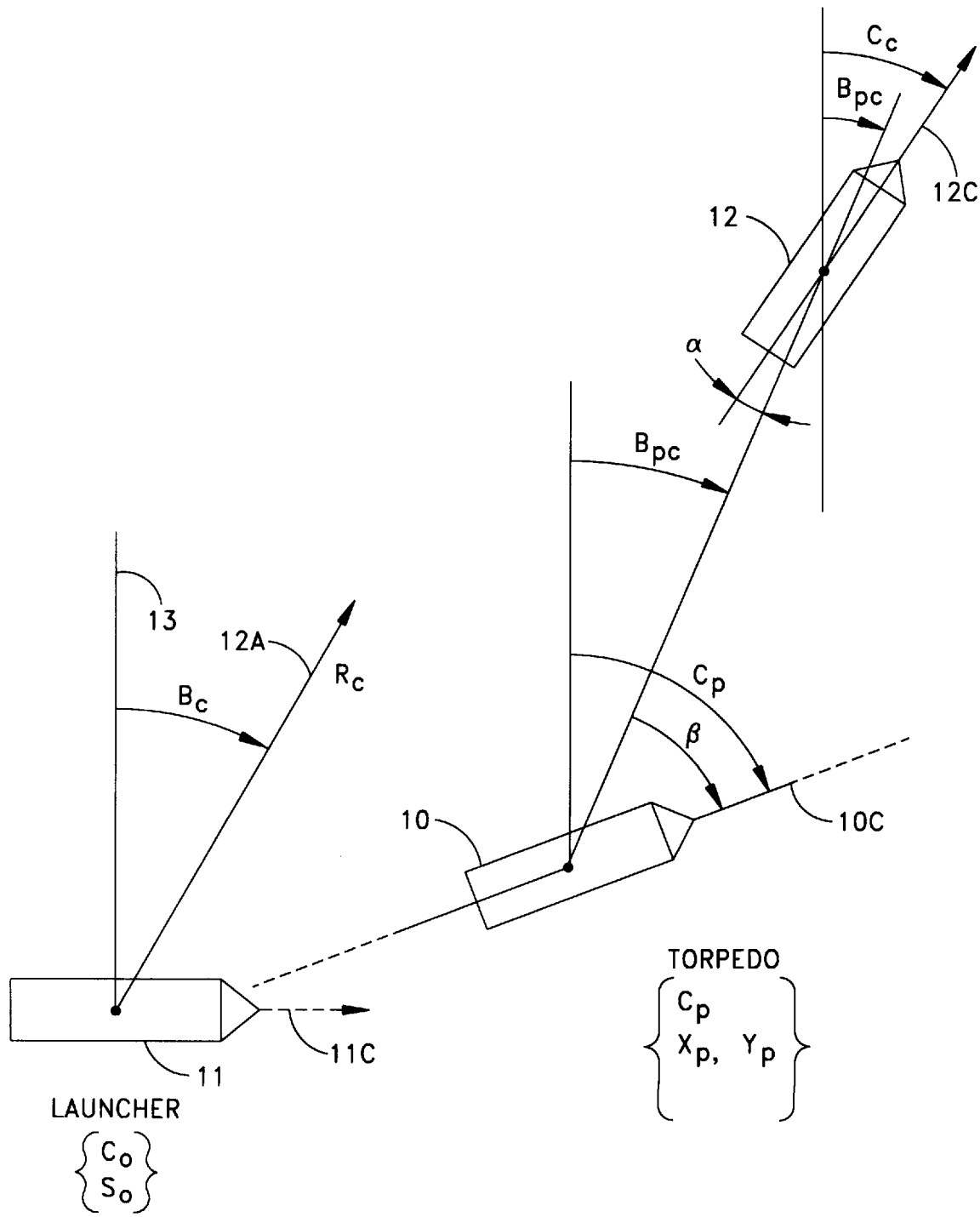
FIG. 1 depicts various relationships among a first site, a contact and a steerable object that are useful in understanding this invention.

FIG. 1 depicts a torpedo 10, as an example of a steerable object, that is moving from a first site, shown as a launcher 11 toward a second site, shown as a target or contact 12. The torpedo 10 has a position ($X_p$, $Y_p$ and $Z_p$) and a course ($C_p$) and speed ($S_p$) along a line 10C. The launcher 11 is moving along a course $C_O$ and at speed $S_O$ as represented by an arrow 11C. The contact 12 is moving at an arbitrary speed along an arbitrary course $C_c$ represented by an arrow 12C. Each of these course lines 11C and 12C are normally measured with respect to some reference shown by a dashed line 13 in FIG. 1, typically magnetic north.

Figure 2:
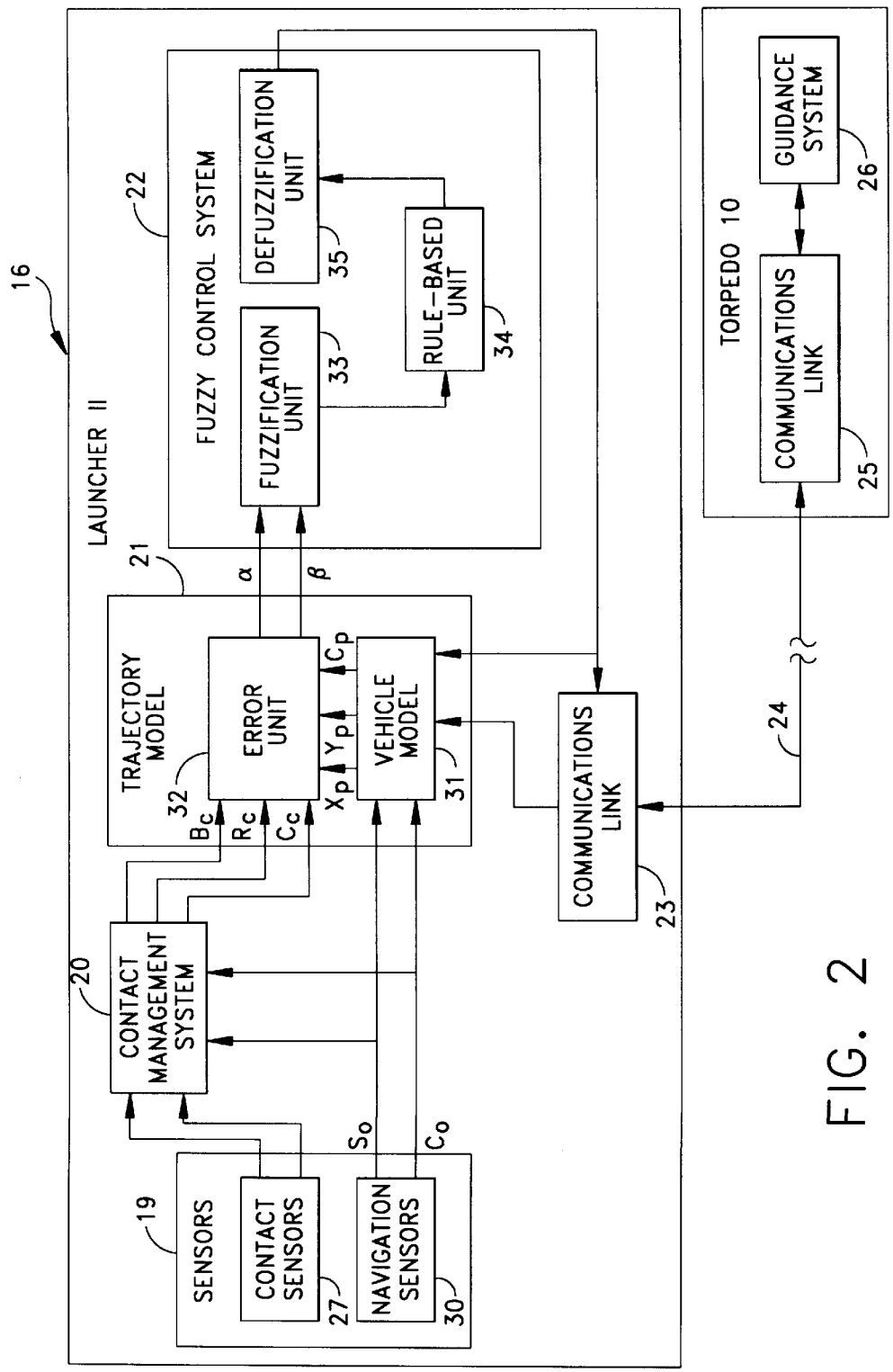
FIG. 2 is a block diagram of a guidance system constructed and operated in accordance with this invention.

Referring now to FIG. 2, a guidance system 16 constructed in accordance with this invention includes sensors 19 that measure various parameters associated with the contact 12 and the launcher 11. A contact management system 20 uses this information to determine the course $C_c$. A trajectory model 21 processes data from the sensors 19 and the system 20 and generates a set of error functions (as first and second sensed variables) for a fuzzy control system 22 that classifies each of the error functions into one or more sensed linguistic variables from a corresponding set of predetermined sensed linguistic variables based upon their associated sensed variable membership functions. This control system 22 logically combines the selected ones of the first and second sensed linguistic variables for identifying one or more control output linguistic variables and corresponding control output membership functions from a control output membership function set. The control system 22 also converts the selected control output membership function or functions into a guidance command. A communications link 23 transfers the guidance command over a bidirectional communications channel 24, typically formed by a wire connected to the torpedo 10, to another communications link 25 and a guidance system 26 in the torpedo 10. Information from the torpedo 10 also transfers through the communication link 23 to the trajectory model 21.

Figure 3A:
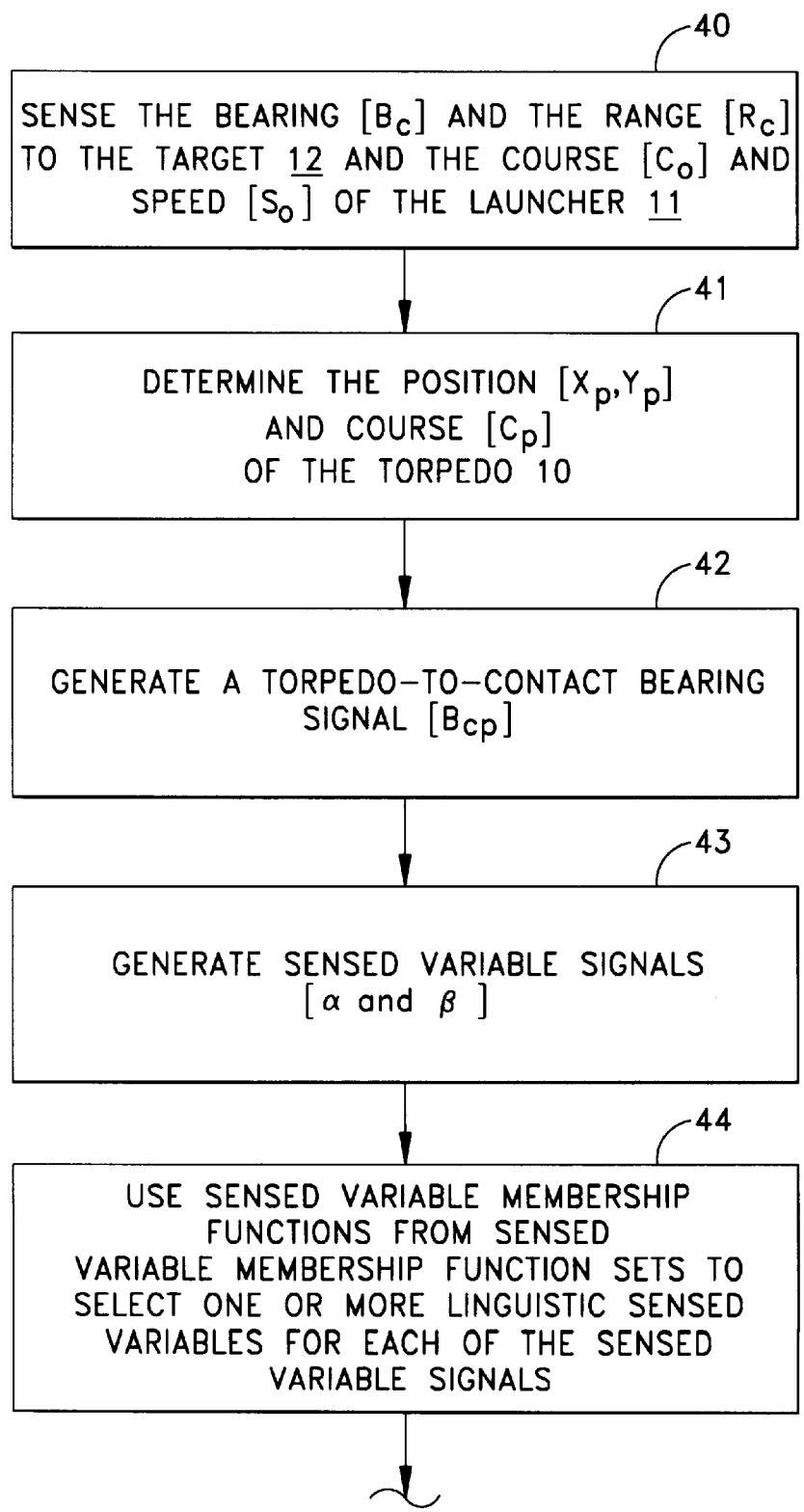
FIGS. 3A and 3B constitute a flow diagram that depicts the operation of the guidance system in FIG. 2.

Referring to FIGS. 1 and 2, the sensors 19 include contact sensors 27 that produce a range $R_C$ to the target 12 and a bearing $B_C$ defined by the angle between the reference line 13 and a line 12A to the target 12. As shown in FIG. 3A, this activity occur during step 40. Navigation sensors 30 of FIG. 2 simultaneously produce the course $C_O$ and speed $S_O$ of the launcher 11 in step 40. In step 41 (FIG. 3A) a vehicle model 31 (FIG. 2) provides the course ($C_p$) and the position ($X_p$, $Y_p$) of the torpedo 10. This information can be obtained utilizing information supplied by the navigation sensors 30 and open loop or dead reckoning updates to the vehicle model 31 or supplemented with information from the torpedo 10.

Whatever the inputs, the contact management system 20 produces three signals for an error unit 32, namely, the $B_c$, $R_c$ and $C_c$ signals that represent the bearing and range to and the course of the contact 12. The vehicle model 31 produces the $C_p$, $X_p$ and $Y_p$ signals indicative of the course and position of the pursuing steerable object. In step 42, the error unit 32 generates a $B_{pc}$ signal that represents the bearing from the torpedo 10 to the contact 12.

In the guidance system 16, the error unit 32 produces an $\alpha$ sensed variable signal that, as shown in FIG. 1, represents an approach error angle, that is, the instantaneous difference between the bearing $B_{pc}$ from the torpedo 10 to the contact 12 and the course $C_c$. The error unit 32 also produces a $\beta$ sensed. variable signal that represents a pursuit angle error, that is, the difference between the course $C_p$ of the torpedo 10 and the bearing $B_{pc}$.

More specifically, during step 43 of each iteration of FIG. 3A the error unit 32 in FIG. 2 converts the incoming signals into $\alpha$ approach error angle and $\beta$ pursuit angle error sensed variable signals as follows:

$$\alpha = B_{pc} - C_c \tag{1}$$

and $$\beta = C_p - B_{pc} \tag{2}$$

Figure 4A:
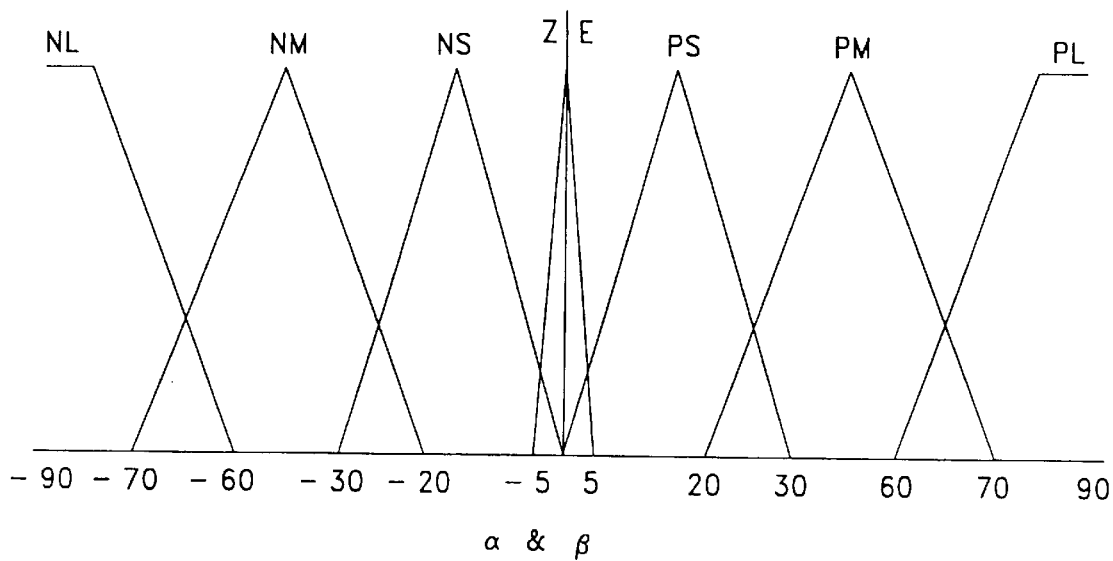
FIGS. 4A and 4B are graphical representations of linguistic variables and their associated membership function sets that are useful to an understanding of this invention.

Step 44 in FIG. 3A represents a procedure by which the control system 22 of FIG. 2 encodes each of the $\alpha$ and $\beta$ sensed variable signals into one or more corresponding sensed linguistic variables based upon sensed variable membership functions from corresponding sensed variable membership function sets. FIG. 4A, for example, discloses a sensed variable membership function set with seven sensed variable membership functions and their corresponding sensed linguistic variables that are used in conjunction with both the $\alpha$ and $\beta$ signals. While this embodiment discloses common definitions of the sensed membership functions and their corresponding sensed linguistic variables, it will be apparent that different sets might be used with each of the $\alpha$, approach angle error, and $\beta$, pursuit angle error, signals.

Assuming that the following relationships exist $$x1 = \alpha \tag{3}$$

and $$x2 = \beta \tag{4}$$

the fuzzification unit 33 in FIG. 2 uses the a signals to select one or more of the seven available $\alpha$ sensed approach angle error linguistic variables and the $\beta$ signals to select one or more of the seven available pursuit angle error linguistic variables respectively. The possibilities in this particular embodiment, that include the approach angle error and the pursuit angle error linguistic variables $T_{x1}$ and $T_{x2}$ respectively, can be designated as:

$$T(x1) = (T^1_{x1}, T^2_{x1}, T^3_{x1}, T^4_{x1}, T^5_{x1}, T^6_{x1}, T^7_{x1}) \tag{5}$$
$$= (NL, NM, NS, ZE, PS, PM, PL)$$

and $$T(x2) = (T^1_{x2}, T^2_{x2}, T^3_{x2}, T^4_{x2}, T^5_{x2}, T^6_{x2}, T^7_{x2}) \tag{6}$$
$$= (NL, NM, NS, ZE, PS, PM, PL)$$

where "NL" denotes a Negative Large sensed linguistic variable; "NS", a Negative Small sensed linguistic variable; "NM", a Negative Medium sensed linguistic variable; "ZE", a Zero sensed linguistic variable; "PS", a Positive Small sensed linguistic variable; "PM", a Positive Medium sensed linguistic variable; an "PL", a Positive Large sensed linguistic variable.

The specific set of membership functions $\mu(x1)$ and $\mu(x2)$ corresponding to inputs x1 and x2 and the sensed approach angle error and pursuit angle error linguistic variables as shown in FIG. 4A can be mathematically stated as follows:

$$\mu(x1)=\mu(x2)=(\mu^1_{xj}, \mu^2_{xj}, \mu^3_{xj}, \mu^4_{xj}, \mu^5_{xj}, \mu^6_{xj}, \mu^7_{xj}) \quad (7)$$

where j=1,2
For j=1,2 and i=2,3,4,5,6

$$\mu^i_{xj} = 1 - \frac{(|xj - C^i_{xj}|)}{\delta^i_{xj}} \quad (8)$$

for $$C^i_{xj}-\delta^i_{xj} \leq xj \leq C^i_{xj}+\delta^i_{xj} \quad (9)$$

and $$\mu^i_{xj}=0 \quad (10)$$

for $$C^i_{xj}-\delta^i_{xj} > xj > C^i_{xj}+\delta^i_{xj} \quad (11)$$

The end conditions, j=1,2 and i=1,7 are defined by the following equations:

$$\mu^i_{xj} = 1 - \frac{(|xj - C^i_{xj}|)}{\delta^i_{xj}} \quad (12)$$

for $$a^i C^i_{xj} \geq a^i_{xj} \geq a^i(C^i_{xj}-a^i\delta^i_{xj}) \quad (13)$$

and $$\mu^i_{xj}=1 \quad (14)$$

for $$a^i C^i_{xj} < a^i xj \quad (15)$$

and $$\mu^i_{xj}=0 \quad (16)$$

and $$a^i(C^i_{xj}-a^i\delta^i_{xj}) > a^i xj \quad (17)$$

where $a^i=1$, except for i=1 where $a^i=-1$.

FIG. 4A depicts graphically the relationship of each of the sensed α and β linguistic variables and associated membership functions in the corresponding membership function set for different values of the α and β signals according to a specific set of values for $C^i_{xj}$ and $\delta^i_{xj}$. In the specific embodiment shown in FIG. 4A certain incoming signals correspond to a single or multiple sensed approach angle error and sensed pursuit angle error linguistic variables based upon corresponding membership functions. For example, in FIG. 4A the membership function set is used to encode either an α or β signal having a value 0 only into a ZE linguistic sensed approach angle error variable or pursuit angle error variable whereas a value of slightly less than +25 is encoded into both PS and PM sensed approach angle error or pursuit angle error linguistic variables.

Figure 3B:
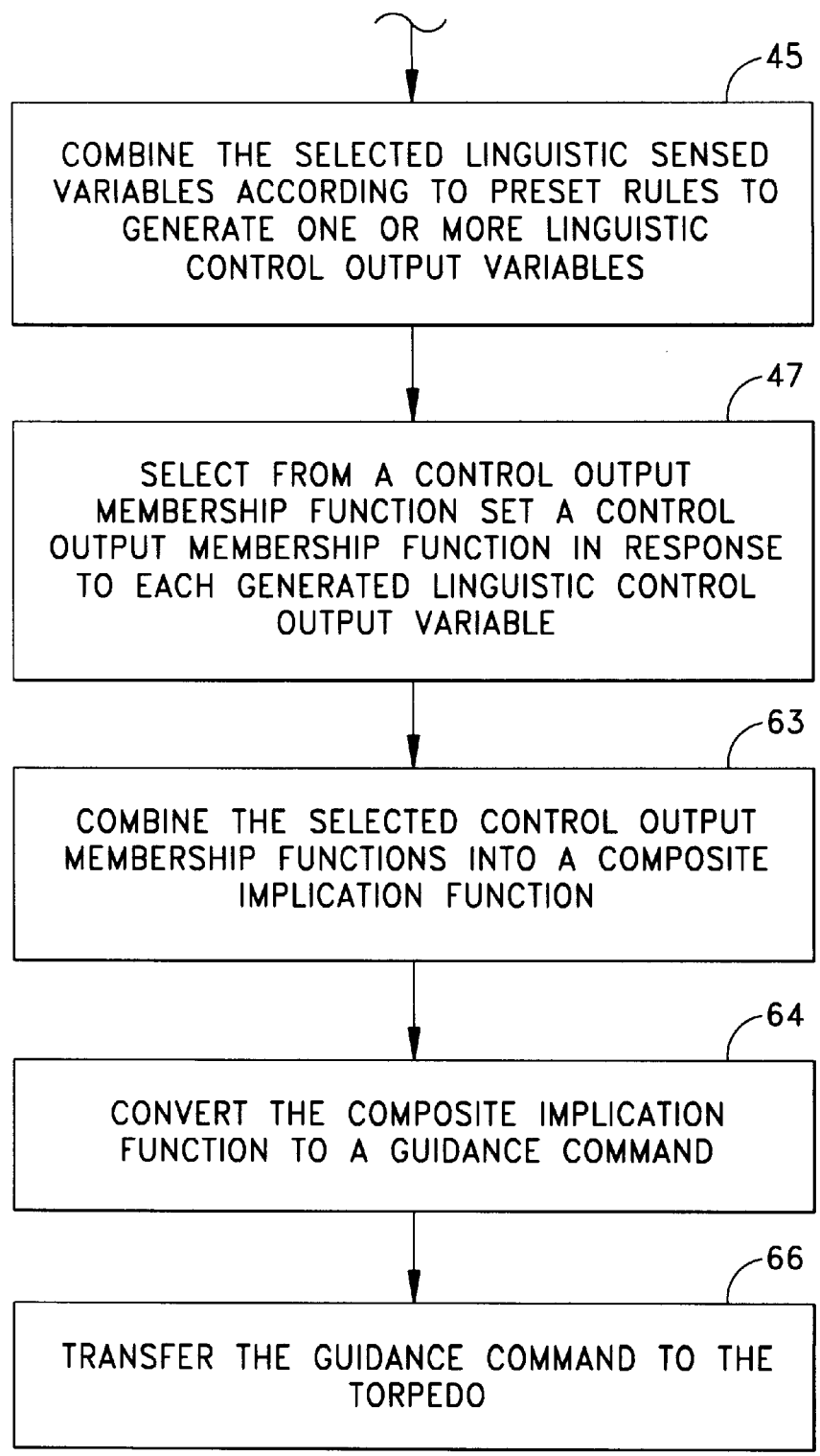
Figure 4B:
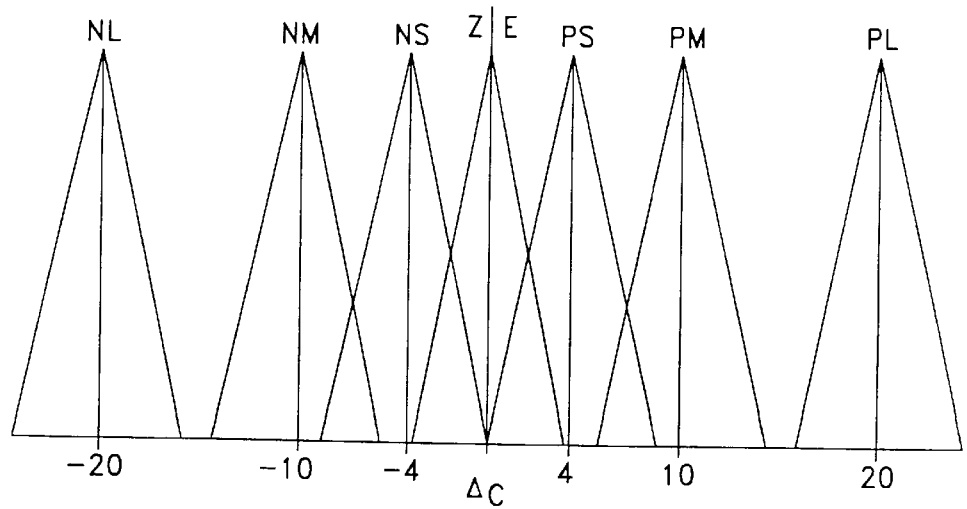
Figure 5:
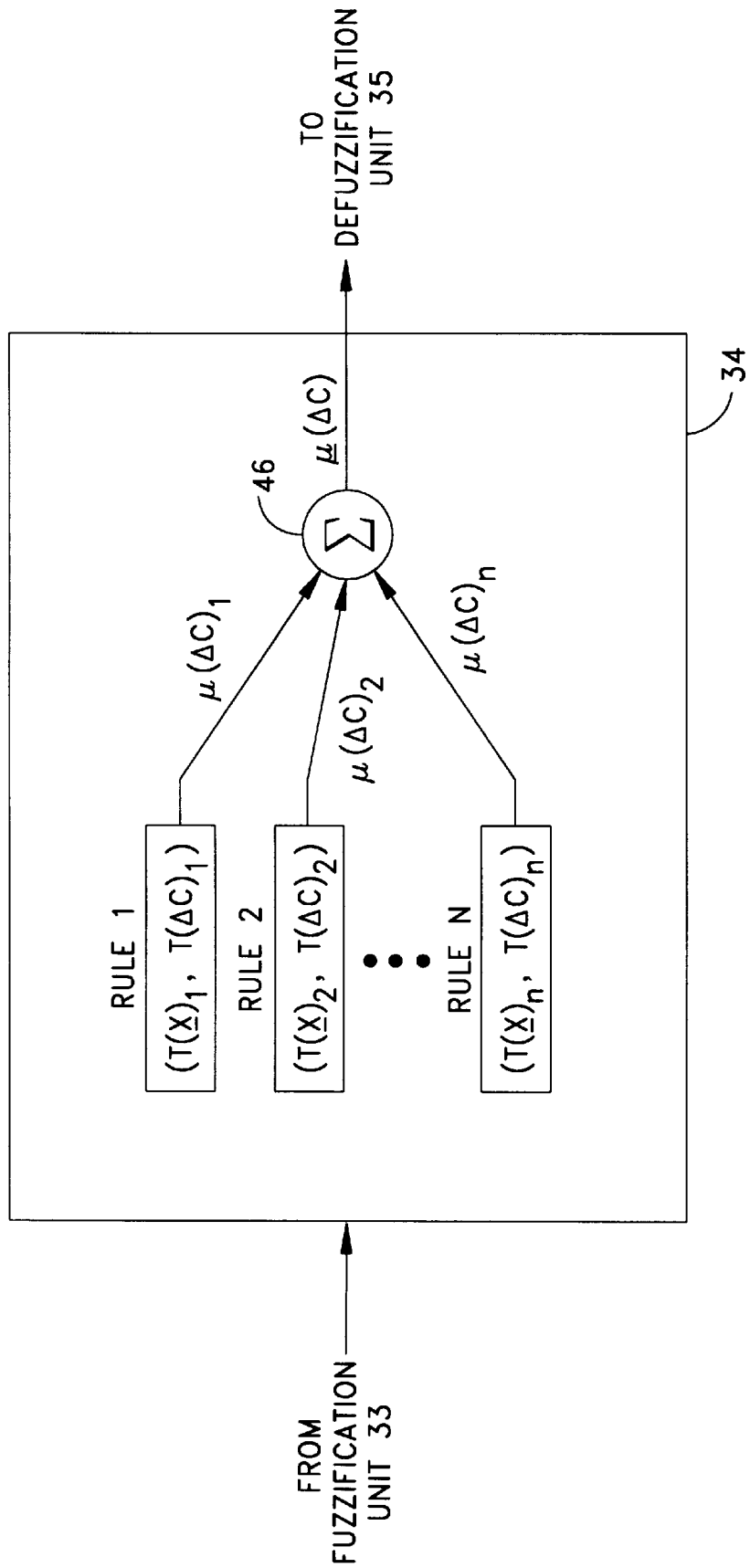
FIG. 5 schematically represents a rule-based unit shown in FIG. 2.

Referring to step 45 in FIG. 3B, the rule-based unit 34 in FIGS. 2 and 5 combines the selected sensed approach angle error and pursuit angle error linguistic variables to produce one or more control output linguistic variables. Each selected control output linguistic variable corresponds to a predefined membership function in a control output membership function set (FIG. 4B). More specifically, each control output linguistic variable is determined according to a set of rules defined in FIG. 6. The control outputs include, in this specific embodiment, seven control output linguistic variables defined as:

$$T(\Delta C) = (T^1_{\Delta C}, T^2_{\Delta C}, T^3_{\Delta C}, T^4_{\Delta C}, T^5_{\Delta C}, T^6_{\Delta C}, T^7_{\Delta C}) \quad (18)$$

$$= (NL, NM, NS, ZE, PS, PM, PL)$$

The corresponding control output membership functions, defined as:

$$\mu(\Delta C)=(\mu^1_{\Delta C}, \mu^2_{\Delta C}, \mu^3_{\Delta C}, \mu^4_{\Delta C}, \mu^5_{\Delta C}, \mu^6_{\Delta C}, \mu^7_{\Delta C}) \quad (19)$$

are shown in FIG. 4B and can be mathematically stated as follows:
for i=1,2,3,4,5,6,7 by $$\mu^i_{\Delta C} = 1 - \frac{(|\Delta C - C^i_{\Delta C}|)}{\delta^i_{\Delta C}} \quad (20)$$

for $$C^i_{\Delta C}-\delta^i_{\Delta C} \leq \Delta C \leq C^i_{\Delta C}+\delta^i_{\Delta C} \quad (21)$$

and by $$\mu^i_{\Delta C}=0 \quad (22)$$

for $$C^i_{\Delta C}-\delta^i_{\Delta C} > \Delta C > C^i_{\Delta C}+\delta^i_{\Delta C} \quad (23)$$

Values for the various constants $C^i$ and $\delta^i$ are associated with different membership functions of the sensed variable and control output variable membership function sets. If $\mu(x1)=\mu(x2)$ represents the sensed variable membership function sets and $\mu(\Delta C)$ represents the control output membership function set, the following table provides some specific examples:

| | $\mu(x1) = \mu(x2)$ | | $\mu(\Delta C)$ | |
|---|---|---|---|---|
| i | $C^i_{x1}$ | $\delta^i_{x1}$ | $C^i_{\Delta C}$ | $\delta^i_{\Delta C}$ |
| 1 | −75 | 15 | −20 | 4.0 |
| 2 | −45 | 25 | −10.0 | 4.0 |
| 3 | −15 | 15 | −4.0 | 4.0 |
| 4 | 0.0 | 0.5 | 0.0 | 4.0 |
| 5 | +15 | 15 | 4.0 | 4.0 |
| 6 | +45 | 25 | 10.0 | 4.0 |
| 7 | +75 | 15 | 20 | 4.0 |

The rule-based unit 34 of FIG. 2 operates according to a series of rules defined in terms of different combinations of the sensed approach angle error and pursuit angle error linguistic variables. For example, if the fuzzification unit classifies both the α and β signals as Negative Large (NL) sensed linguistic variables, the rule-based unit 34 will generate a positive large (PL) control output linguistic variable.

FIG. 6 depicts the control output linguistic variable membership rules in matrix form.

The rule-based unit 34 in FIG. 5 utilizes all the possible combinations for a given set of readings to produce an output based upon the selection of one or more control output membership functions. More specifically, if α=+0.3 and β=0.15, the α signal can be classified both as ZE and PS sensed approach, angle error linguistic variables based upon the x1 or α membership function set of FIG. 4A: while the β signal can be classified both as ZE and PS sensed pursuit angle error linguistic variable based upon the x2 or β membership function set of FIG. 4A.

FIG. 6 discloses that the rule-based unit 34 will correlate each of the possible four input combinations as follows:

IF α is ZE AND β is ZE THEN ΔC is ZE.
IF α is ZE AND β is PS THEN ΔC is NS.
IF α is PS AND β is ZE THEN ΔC is PS.
IF α is PS AND β is PS THEN ΔC is PS. Thus in step 45 in FIG. 3B the rule-based unit 34 produces different output consequences or control output linguistic variables derived from these selected rules.

A summing circuit 46, symbolically referenced in FIG. 5, essentially combines each of the output variable membership functions corresponding to each of the selected control output linguistic variables to produce an output signal as shown by steps 47 and 63 in FIG. 3B. More specifically, the summing circuit 46 in FIG. 5 combines the selected control output membership functions scaled by the various sensed variable signals as disclosed in the previously identified U.S. Pat. No. 5,436,832 that provides scaling for each control output membership function through the selection of the lower of the intercepts of the input signals with the corresponding sensed variable membership functions incorporated in the specific rule.

Stated mathematically, the inferred control output function from each of the above specified rules are, respectively, $$\zeta_{(1)} = Y^4_{x1} \wedge Y^4_{x2} = \min(Y^4_{x1}, Y^4_{x2}) \quad (24)$$

$$\zeta_{(2)} = Y^4_{x1} \wedge Y^5_{x2} = \min(Y^4_{x1}, Y^5_{x2}) \quad (25)$$

$$\zeta_{(3)} = Y^5_{x1} \wedge Y^4_{x2} = \min(Y^5_{x1}, Y^4_{x2}) \quad (26)$$

$$\zeta_{(4)} = Y^5_{x1} \wedge Y^5_{x2} = \min(Y^5_{x1}, Y^5_{x2}) \quad (27)$$

where $Y^i_{xj}$ is $\mu^i_{xj}$ evaluated at a specific value of xj(t) at time "t" and where "∧" denotes a fuzzy "AND". The inferred value of the control action from the first rule is $\zeta_{(1)}\mu^4_{\Delta c}(\Delta C)$, from the second rule is $\zeta_{(2)}\mu^3_{\Delta c}(\Delta C)$, from the third rule is $\zeta_{(3)}\mu^5_{\Delta c}(\Delta C)$, and from the fourth rule is $\zeta_{(4)}\mu^5_{\Delta c}(\Delta C)$. The control output composite implication function, $\mu_{\Delta c}(\Delta C)$, of the rule-based unit 34 for this example is expressed as:

$$\underline{\mu}(\Delta C) = \mu(\Delta C)_{(1)} \vee \mu(\Delta C)_{(2)} \vee \mu(\Delta C)_{(3)} \vee \mu(\Delta C)_{(4)} \quad (28)$$

$$= \zeta_{(1)}\mu^4_{\Delta C}(\Delta C) + \zeta_{(2)}\mu^3_{\Delta C}(\Delta C) + \zeta_{(3)}\mu^5_{\Delta C}(\Delta C) +$$

$$\zeta_{(4)}\mu^5_{\Delta C}(\Delta C)$$

where "∨" denotes the fuzzy "OR".

As previously indicated, the rule-based unit 34 in FIG. 2 and 5 also operates in accordance with step 63 of FIG. 3B by combining the scaled fuzzy control output membership functions into a composite control output function that is acceptable for use in the defuzzification unit 35. In general the output function can be expressed as:

$$\mu_{\Delta C}(\Delta C) = \Sigma_k \zeta_{(k)} \mu_{\Delta C(k)}(\Delta C) \quad (29)$$

A number of methods can be utilized for converting composite outputs into guidance commands in step 64. The defuzzification unit 35 uses a centroid method to provide guidance commands. Mathematically the centroid is computed as follows:

$$\Delta C = \frac{\sum_k [(\zeta_{(k)} C_{\Delta C_{(k)}} I_{\Delta C_{(k)}})]}{\sum_k \zeta_{(k)} I_{\Delta C_{(k)}}} \quad (30)$$

where $\Sigma_{(k)}$ is the summation over all the rules selected by the rule-based unit 34 and $I_{\Delta C(k)}$ and $C_{\Delta C(k)}$ are the respective area and centroid of the kth rule consequent set membership function. The defuzzification unit 35 calculates the centroid to produce a resulting ΔC signal that is the finite signal for controlling the torpedo 10 in FIG. 1.

After the control system 22 generates its command signal, the communications link 23 transfers the command signal over the communications channel 24 to the communications link 25 in step 66 of FIG. 3B. The guidance system 26 responds to any command requiring a course alteration by changing the path of the torpedo 10 so as to maintain the specified trajectory.

Figure 7:
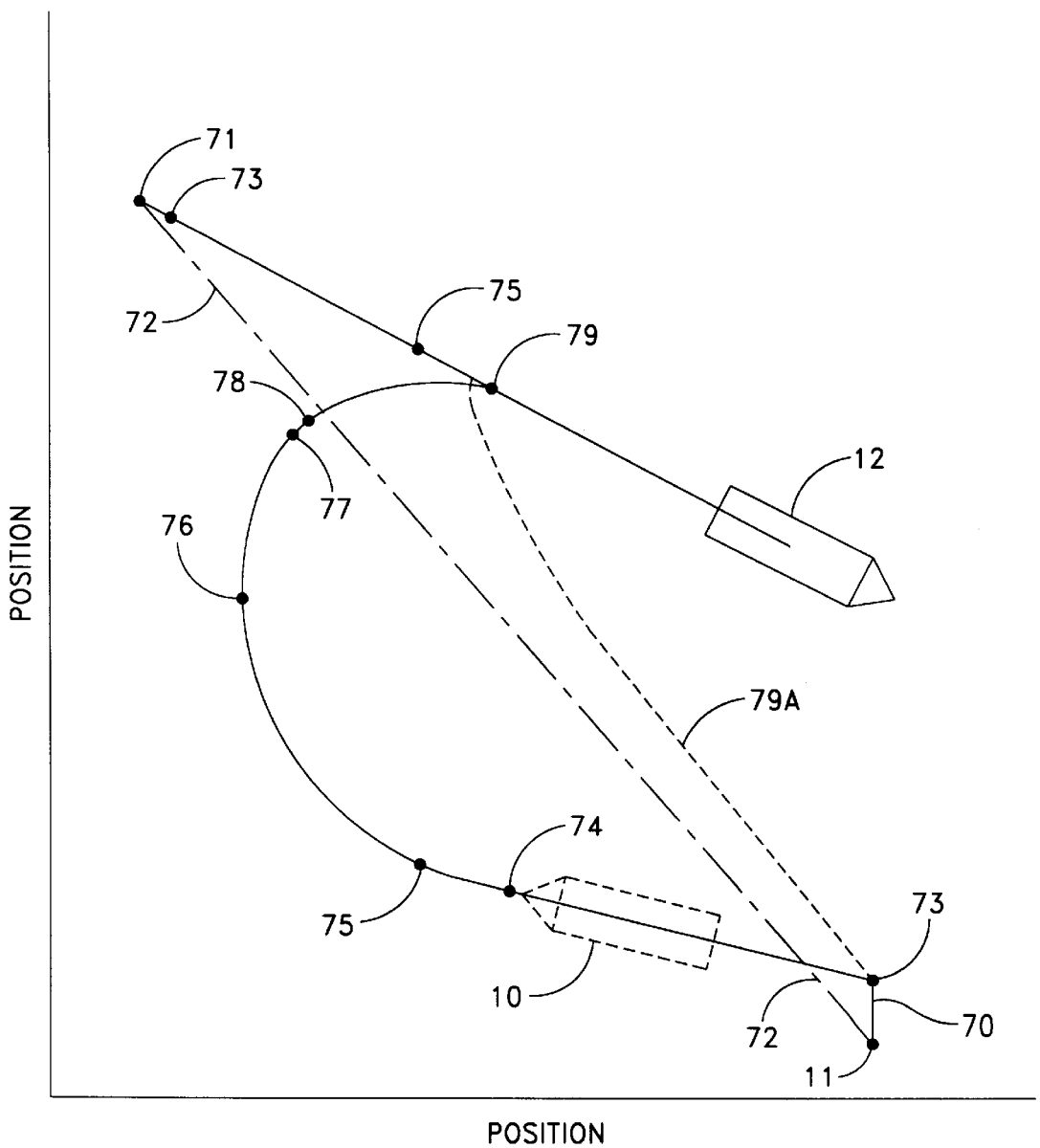
FIG. 7 graphically represents the operation of the guidance system shown in FIG. 2 in directing a steerable object toward a moving contact.
Figure 8:
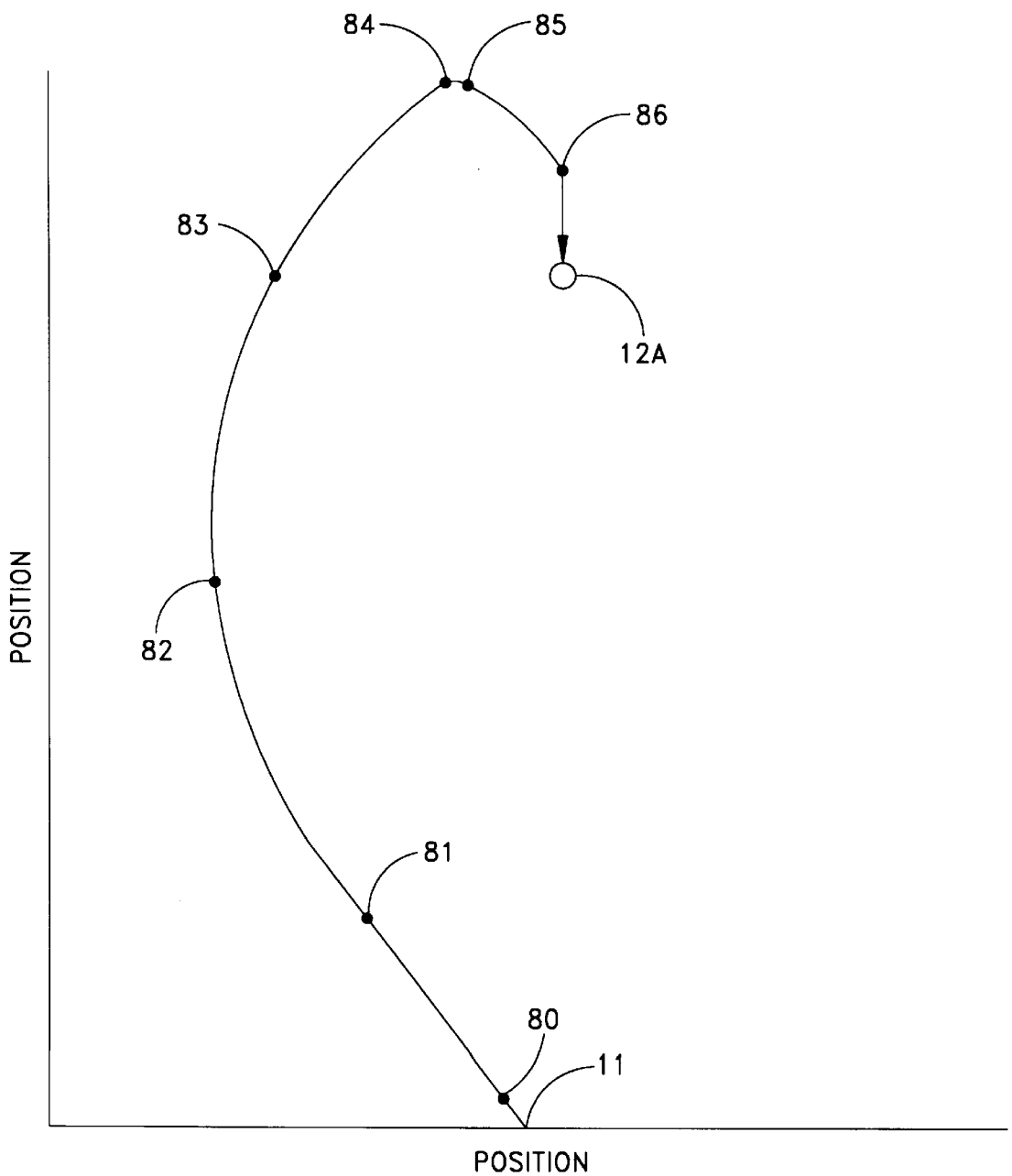
FIGS. 8 and 9 depict the operation of the guidance system shown in FIG. 2 in directing a steerable object toward a stationary contact along two final approach courses.
Figure 9:
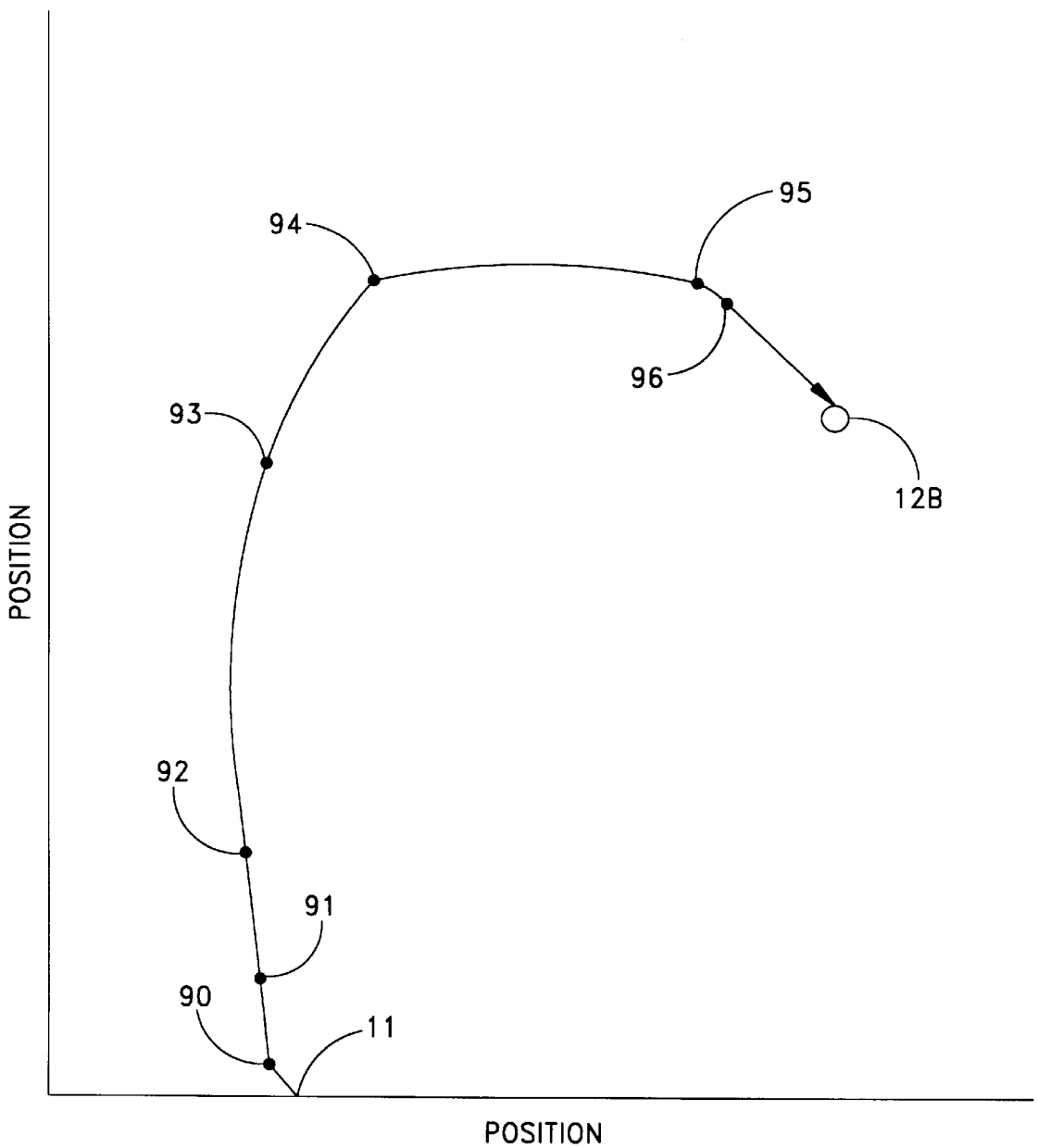

The operation of the guidance system 16 can be better understood and appreciated by reference to FIGS. 7 through 10. FIG. 7 depicts the trajectories of a pursuing vehicle and moving contact; FIGS. 8 and 9, the trajectories of a pursuing vehicle toward a stationary contact along two different final approach courses. FIG. 10 provides some typical sensed variable values, corresponding α and β values and sensed linguistic variables and resultant control output linguistic variables. FIG. 10 therefore indicates the operation of the guidance system 16 in a qualitative manner. Exact guidance commands will depend upon the magnitudes of the α and β signals and the conversion of the control output linguistic variables into a guidance command, all as described in the above-identified U.S. Pat. No. 5,436,832.

In FIG. 7, it is assumed that the torpedo launches along a track 70 while the target or contact 12 is at position 71. The track 70 bears essentially at 45° to an initial bearing line 72 with a torpedo speed that is about twice the speed of the contact 12 for this example. In accordance with accepted procedures, the torpedo initially advances along the track 70 independently of the control system in FIG. 2 until the guidance system 16 takes control of the torpedo at position 73. As the control system takes over at position 73, by inspection, the following approximate relationships exist, namely: $B_{pc}$≈314°, $C_c$=120° and $C_p$=0°. Whenever a bearing, such as the $B_{pc}$ bearing at this position, is greater than 180° or less than −180°, it is converted to an opposite reading. That is, the 314° positive reading for the $B_{pc}$ bearing is converted to −46°, the equivalent bearing magnitude to be less than |180°|. So in FIG. 10, $B_{pc}$≈−46°. The membership function sets in FIG. 4A convert these signals to NL and PM sensed linguistic variables respectively. According to the matrix of FIG. 6, the combination of these two sensed linguistic variables produces an NL control output linguistic variable. The torpedo turns initially at nearly a maximum rate to port until a course of $C_p$≈284°, i.e., a $C_p$≈76°, has been achieved. At this point the torpedo travels on this constant course to position 75. By way of example, if, at position 74 $B_{pc}$≈−27°, $C_p$≈−76° and $C_c$=120°, the NL and NM sensed linguistic variables are selected respectively. Consequently a ZE control output linguistic variable is produced.

From position 75 to position 77 more than one control output linguistic variable is selected (i.e., PL/ZE) at each time step of the trajectory. The result is to turn the steerable object starboard toward the contact where the magnitude of the starboard command depends on the relative weightings of the selected control output membership functions. Locations 75 and 76 are included by way of examples. At position 75 $B_{pc} \approx -15°$, $C_p \approx -76°$ and $C_c = 120°$, the resulting selection of the NL and NL/NM sensed linguistic variables shifts the output to a PL/ZE control output linguistic variables. The trajectory begins a turn to starboard to produce an arcuate path to position 76. If, at position 76 $B_{pc} \approx 57°$, $C_p \approx -6°$ and $C_c = 120°$, the sensed linguistic variables NL/NM and NL/NM are selected, the output is PL/ZE/PM/NS control output linguistic variables continuing to produce a gradual starboard turn.

When the torpedo 10 initially reaches location 77, $B_{pc} \approx 96°$, $C_c = 120°$ and $C_p \approx 51°$. The resulting $\alpha$ and $\beta$ signals produce NM/NS and NM sensed linguistic variables that, in turn, produce NS/PM control output linguistic variables upon which the guidance command increases the turn rate to starboard until a course of $C_p \approx 76°$ is attained at position 78. Then the turn to starboard is reduced to a gradual turn producing a slight arcuate path to position 79. When the steerable object approaches position 79, $B_{pc} \approx 120°$, $C_p \approx 106°$ and $C_c = 120°$; the sensed linguistic variables ZE/PS and NS are selected and the output PS/PS control output linguistic variables result in an increased turn to starboard. When $C_p \approx 120°$ at position 79, the torpedo is aimed directly at the contact 12, $\alpha = \beta = 0°$, so no additional control is exerted assuming that the contact 12 continues along a straight line course. Thus in this particular mode the torpedo 10 eventually overtakes and intercepts the contact 12 along a final approach course corresponding to the course of the contact 12. By definition this approach will be from the stern or the tail of the contact 12.

In FIG. 7 a dashed line 79A discloses the trajectory that would occur as a result of applying prior art classical theory. At approximately position 79 this approach requires a rapid turn. Conventional pursuing vehicles or steerable objects can not attain this turning radius and rate. Thus the guidance system 16 in FIG. 2 readily produces a trajectory that has not been attained by classical theory.

It has also been found that the control system 16 in FIG. 2 is equally suited for guiding a steerable object to a fixed point with a specification of a final approach course. FIG. 8 discloses a fixed point 12A that is dead ahead of a launch point 11. In this particular embodiment it is assumed that the steerable object launches along a 315° course to a position 80 where the guidance system 16 takes control. At position 80, $B_{pc} \approx 1°$ and $C_p = 315°$ or, in accordance with the foregoing convention, $C_p \approx -45°$. When the point 12A is fixed, the parameter $C_c$ is set to the final approach course; in this particular example $C_c = 180°$. At position 80, $\alpha \approx -179°$ and $\beta \approx -46°$ so the sensed linguistic variables are the NL and NM linguistic variables respectively such that the control output linguistic variable is the ZE variable according to FIG. 6. Between positions 80 and 81 the control system produces a ZE control output linguistic variable and the trajectory of the steerable object continues along a straight line path.

From points 81 to 84, more than one control output linguistic variable is selected (e.g. ZE/PL) at each time step of the trajectory. The result is to turn the steerable object starboard toward the contact where the magnitude of the starboard command depends on the relative weighting of the selected control output membership functions. Locations 81, 82 and 83 are included by way of examples. At position 81, $B_{pc} \approx 16°$ and $C_p \approx -45°$ and $\alpha \approx -164°$ and $\beta \approx -61°$. The $\alpha$ and $\beta$ membership functions select the NL and NL/NM sensed linguistic variables respectively. The resulting PL/ZE control output linguistic variables are converted into a guidance command that begins a slow turn to starboard. At position 82, $B_{pc} \approx 47°$ and $C_p \approx -14°$. The resulting a and a membership functions select the NL and NL/NM sensed linguistic variables. Control continues to be based on PL/ZE control output linguistic variables and the turn to starboard continues given the relative magnitudes of those signals. At position 83 $B_{pc} \approx 84°$ and $C_p \approx 23°$. The $\alpha$ and $\beta$ membership functions again select the NL and NL/NM sensed linguistic variables. The resulting PL/ZE control output linguistic variables continue the turn to starboard. When the pursuing vehicle initially reaches position 84, $B_{pc} \approx 156°$ and $C_p = 115°$. At this position $\alpha \approx -24°$ and $\beta \approx -41°$ that translate to NM/NS and NM sensed linguistic variables respectively. The control outputs are the NS/PM control output linguistic variables. This produces a more rapid turn to starboard due to the heavier weighting of the output PM membership function. When a course of $C_p \approx 137°$ is attained at location 85, the control output linguistic variables result in a decrease in the rate of turn to starboard producing the slightly arcuated path to location 86.

When the pursuing vehicle initially reaches position 86, $B_{pc} \approx 179°$ and $C_p \approx 164°$. The $\alpha$ and $\beta$ membership functions therefore select the ZE/PS and NS sensed linguistic variables respectively. The resulting PS/PS control output linguistic variables continue the turn to starboard but at a much faster rate until $C_p = 180°$. When $C_p \approx 180°$, $\alpha = \beta = 0°$ so the steerable object moves on a straight line along a course of 180° until it reaches the stationary point 12A along the designated final approach course.

FIG. 9 depicts the trajectory produced when a stationary point bears 45° with respect to the launch point 11 and the desired final approach course is 135°. At position 90, when the guidance system 16 in FIG. 2 takes over, $B_{pc} \approx 47°$, $C_c = 135°$ and $C_p \approx 315°$ that converts to $C_p = -45°$. The membership functions in FIG. 4A convert both the $\alpha$ and $\beta$ signals to NL sensed linguistic variables that produce a PL control output linguistic variable. The guidance system 16 in FIG. 2 responds to this control output linguistic variable by initiating a rapid turn to starboard. When the pursuing vehicle reaches a heading of about 355° (i.e., $C_p \approx -5°$) the membership functions convert the $\alpha$ and $\beta$ signals to NL and NM sensed linguistic variables respectively, producing a ZE control output linguistic variable and a straight path to position 92. For example at position 91 $B_{pc} \approx 51°$ and $C_p 355°$ or $C_p \approx -5°$. Consequently $\alpha \approx -84°$ and $\beta \approx -56$ so the membership functions select NL and NM sensed linguistic variables. The resulting ZE control output sensed linguistic variable continues the steerable object on a substantially straight line.

At position 92, $B_{pc} \approx 56°$ and $C_p \approx -5°$ so $\alpha \approx -79°$ and $\beta \approx -61°$. The selected NL and NL/NM sensed linguistic variables for the $\alpha$ and $\beta$ signals respectively produce PL/ZE control output linguistic variables that starts a gradual turn to starboard.

Also at position 93 $B_{pc} \approx 89°$ and $C_p \approx 27°$. At this point the NM and NL/NM sensed linguistic variables are selected in response to the $\alpha$ and $\beta$ signals respectively. Consequently the PM/NS control output linguistic variables are selected and the guidance system 16 continues the starboard turn.

When the pursuing vehicle approaches position 94, $B_{pc} \approx 108°$ and $C_p \approx 52°$. At this position $\alpha \approx -27°$ and $\beta \approx -56°$ so the NM/NS sensed linguistic variables are selected in response to the $\alpha$ variable signal and the NM sensed linguistic variable is selected in response to the β variable signal. As a result the guidance system will produce both NS and PM control output sensed linguistic variables that are converted into a final guidance command based upon the weighting of the two selected control output membership functions. The result is a much faster turn to starboard that subsequently slows as $C_p\_90°$. This gradual starboard turn continues to location 95. At position 95, initially $B_{pc}\approx135°$ and $C_p\approx125°$, the sensed linguistic variables ZE/PS and NS are selected and the output PS/PS control output linguistic variables result in a rapid turn to starboard until a course of $C_p\approx135°$ is attained at location 96. When the course of the pursuing vehicles $C_p$ reaches the desired course, $C_p=135°$ in this example, and as shown in FIG. 10, $\alpha=\beta=0°$ so the pursuing vehicle continues along the selected final approach course of 135° to the stationary point 12B.

Thus, in accordance with this invention a guidance system 16 as shown in FIG. 2 uses a bearing from a steerable object to a contact or stationary point, a steerable object course and a final approach course to a contact or stationary point to guide the steerable object to the contact or stationary point along the final approach course. If the contact is moving, the contact course is the final approach course. If the moving contact is a moving ship, the steerable object, such as a torpedo, approaches from the stern of the ship. If the contact is at a stationary point, the final approach course will be substituted as the contact course and defines the angle at which the steerable object will approach and intercept the point. The fuzzification unit 33 uses sensed variable membership functions corresponding to (1) the difference between the bearing from the steerable or pursuing object to the contact and the final approach course and (2) the difference between the course of the steerable or pursuing object and the foregoing bearing to encode each of the inputs obtained during one iteration into one or more sensed linguistic variables. A rule-based unit 34 converts these selected sensed linguistic variables into one or more control output linguistic variables that correspond to control output membership functions of a control output membership function set that then can be combined by diverse procedures to obtain a control signal.

As is apparent, this control system 22 emulates operations that reflect heuristic considerations through the utilization of a rule-based expert system that is contained in the matrix of FIG. 6 and that operates with linguistic variables. This system includes knowledge based upon specific experimental data and the experience of individuals.

This invention has been described in terms of block diagrams, processes and graphical analysis that will enable anyone of ordinary skill in control systems art to construct a specific embodiment of such a control system. It will be apparent that many modifications can be made to the disclosed apparatus without departing from the invention. Therefore, it is the intent of the appended claims to cover all such variations and modifications as come within the true spirit and scope of this invention.

What is claimed is:

1. A system residing on a launching site for guiding a steerable object from said launching site to a contact comprising:

means for generating bearing and course signals at the launching site representing the bearing from and course of the steerable object to the contact and a final approach course along which the steerable object is to intercept the contact;

error signal means responsive to the signals from said generating means for generating a first sensed variable signal based upon the bearing from the steerable object to the contact and the final approach course and a second sensed variable signal based upon the bearing from the steerable object to the contact and the course of the steerable object;

fuzzy control means responsive to said first and second sensed variable signals for generating a guidance command at the launching site for remotely controlling the steerable object from the launching site; and means for transferring the guidance command from the launching site to the steerable object whereby the steerable object is guided along a trajectory to intercept the contact along the final approach course.

2. A guidance system as recited in claim 1 wherein said error signal means generates the first sensed variable signal as a signal α given by $$\alpha=B_{pc}-C_c$$

and generates the second sensed variable signal as a signal β given by $$\beta=C_p-B_{pc}$$

wherein $B_{pc}$ represents the bearing from the steerable object to the contact, $C_c$ represents the final approach course of the contact and $C_p$ represents the course of the steerable object.

3. A guidance system as recited in claim 1 wherein the contact is moving along a course $C_c$ and said error signal means generates the first sensed variable signal as α signal a given by $$\alpha=B_{pc}-C_c$$

and generates the second sensed variable signal as a signal β given by $$\beta=C_p-B_{pc}$$

wherein $B_{pc}$ represents the bearing from the steerable object to the contact and $C_p$ represents the course of the steerable object whereby the steerable object intercepts the contact along the final approach course from the rear of the contact.

4. A guidance system as recited in claim 1 wherein the contact is a stationary site, the steerable object is to approach the stationary site along a course $C_c$ and said error signal means generates the first sensed variable signal as a signal α given by $$\alpha=B_{pc}-C_c$$

and generates the second sensed variable signal as a signal β given by $$\beta=C_p-B_{pc}$$

wherein $B_{pc}$ represents the bearing from the steerable object to the stationary site and $C_p$ represents the course of the steerable object.

5. A guidance system as recited in any of claims 1 through 4 wherein said fuzzy control means includes storage means for storing at least one set of sensed linguistic variables and associated sets of sensed variable membership functions and a selection means for selecting sensed linguistic variables based upon the sensed variable signals and sensed variable membership functions wherein the sensed variable membership sets provide sensed variable membership functions for the values of the first and second sensed variable signals.

6. A guidance system as recited in any of claims 1 through 4 wherein said fuzzy control means includes storage means for storing a set of sensed linguistic variables and a set of sensed variable membership functions and a selection means for selecting sensed linguistic variables based upon the sensed variable signals and sensed variable membership functions wherein the sensed variable membership set provides the sensed variable membership functions for the values of both of the first and second sensed variable signals.

7. A guidance system as recited in claim 6 wherein said first selection means assigns a value to each of the selected sensed linguistic variables in response to the magnitude of each sensed variable signal.

8. A guidance system as recited in claim 1 wherein said fuzzy control means includes:
first storage means for storing a set of seven sensed linguistic variables and an associated set of variable membership functions;
first selection means for selecting sensed linguistic variables based upon the sensed variable signals and sensed variable membership functions in said first storage means for both the first and second sensed variable signals;
second storage means for storing a set of seven control output linguistic variables and an associated set of control output membership functions; and
second selection means for combining the sensed linguistic variables to produce at least one control output linguistic variable to produce the control output based upon the control output membership functions corresponding to the at least one control output linguistic variable.

9. A guidance system as recited in claim 8 wherein said second selection means includes means for selecting a control output linguistic variable in response to each combination of selected sensed linguistic variables according to a set of logical rules and wherein said fuzzy control means additionally includes means for combining said control output membership functions corresponding to the selected control output linguistic variables.

10. A guidance system as recited in claim 9 wherein said combining means includes means for obtaining the centroid of the combined control output membership functions.

11. An iterative method for guiding a steerable object from a launching site to a contact comprising, during each iteration, the steps of:
determining parameters corresponding to the bearing from the steerable object to the contact, the course of the steerable object and a final approach course along which the steerable object is to intercept the contact;
generating a first sensed variable signal based upon the bearing from the steerable object to the contact and the final approach course and a second sensed variable signal representing the bearing and the course of the steerable object;
generating, in a fuzzy controller at the launching site, a guidance command for controlling remotely the steerable object in response to the first and second sensed variable signals;
transferring the guidance command from the fuzzy controller to the steerable object whereby the steerable object is guided along a trajectory to intercept the contact along the final approach course.

12. A method as recited in claim 11 wherein the first sensed variable signal is generated as a signal α given by $$\alpha = B_{pc} - C_c$$

and the second sensed variable signal is generated as a signal β given by $$\beta = C_p - B_{pc}$$

wherein $B_{pc}$ represents the bearing from the steerable object to the contact, $C_c$ represents the final approach course of the contact and $C_p$ represents the course of the steerable object.

13. A method as recited in claim 11 wherein the contact is moving along a course $C_c$ and the first sensed variable signal is generated as a signal α given by $$\alpha = B_{pc} - C_c$$

and the second sensed variable signal is generated as a signal β given by $$\beta = C_p - B_{pc}$$

wherein $B_{pc}$ represents the bearing from the steerable object to the contact and $C_p$ represents the course of the steerable object whereby the steerable object intercepts the contact along the final approach course from the rear of the contact.

14. A method as recited in claim 11 wherein the contact is a stationary site, the steerable object is to approach the stationary site along a course $C_c$ and the first sensed variable signal is generated as a signal α given by $$\alpha = B_{pc} - C_c$$

and the second sensed variable signal is generated as a signal β given by $$\beta = C_p - B_{pc}$$

wherein $B_{pc}$ represents the bearing from the steerable object to the contact and $C_p$ represents the course of the steerable object.

15. A method as recited in any of claims 11 through 14 wherein the generation of the guidance command includes storing at least one set of sensed linguistic variables and associated sets of sensed variable membership functions in the fuzzy controller and selecting sensed linguistic variables based upon the sensed variable signals and sensed variable membership functions wherein the sensed variable membership sets provide sensed variable membership functions for the values of the first and second sensed variable signals.

16. A method as recited in any of claims 11 through 14 wherein the generation of the guidance command includes storing a set of sensed linguistic variables and a set of sensed variable membership functions and selecting sensed linguistic variables based upon the sensed variable signals and sensed variable membership functions wherein the sensed variable membership set provides the sensed variable membership functions for the values of both of the first and second sensed variable signals.

17. A method as recited in claim 16 wherein during said selection step a value is assigned to each of selected sensed linguistic variables in response to the magnitude of the sensed variable signal.

18. A method as recited in claim 11 wherein said generation of the command signal in the fuzzy controller includes
storing a first set of seven sensed linguistic variables and an associated set of variable membership functions;
selecting sensed linguistic variables based upon the sensed variable signals and sensed variable membership functions from the first set for both the first and second sensed variable signals;
storing a set of seven control output linguistic variables and an associated set of control output membership functions; and
combining the sensed linguistic variables to produce at least one control output linguistic variable to produce the control output based upon the control output membership functions corresponding to the at least one control output linguistic variable.

19. A method as recited in claim 18 wherein said combining step includes selecting a control output linguistic variable in response to each combination of selected sensed linguistic variables according to a set of logical rules and combining the selected control output membership functions corresponding to the selected control output linguistic variables.

20. A method as recited in claim 19 wherein said combining step includes obtaining the centroid of the combined control output membership functions.

* * * * *